UNITED STATES PATENT OFFICE.

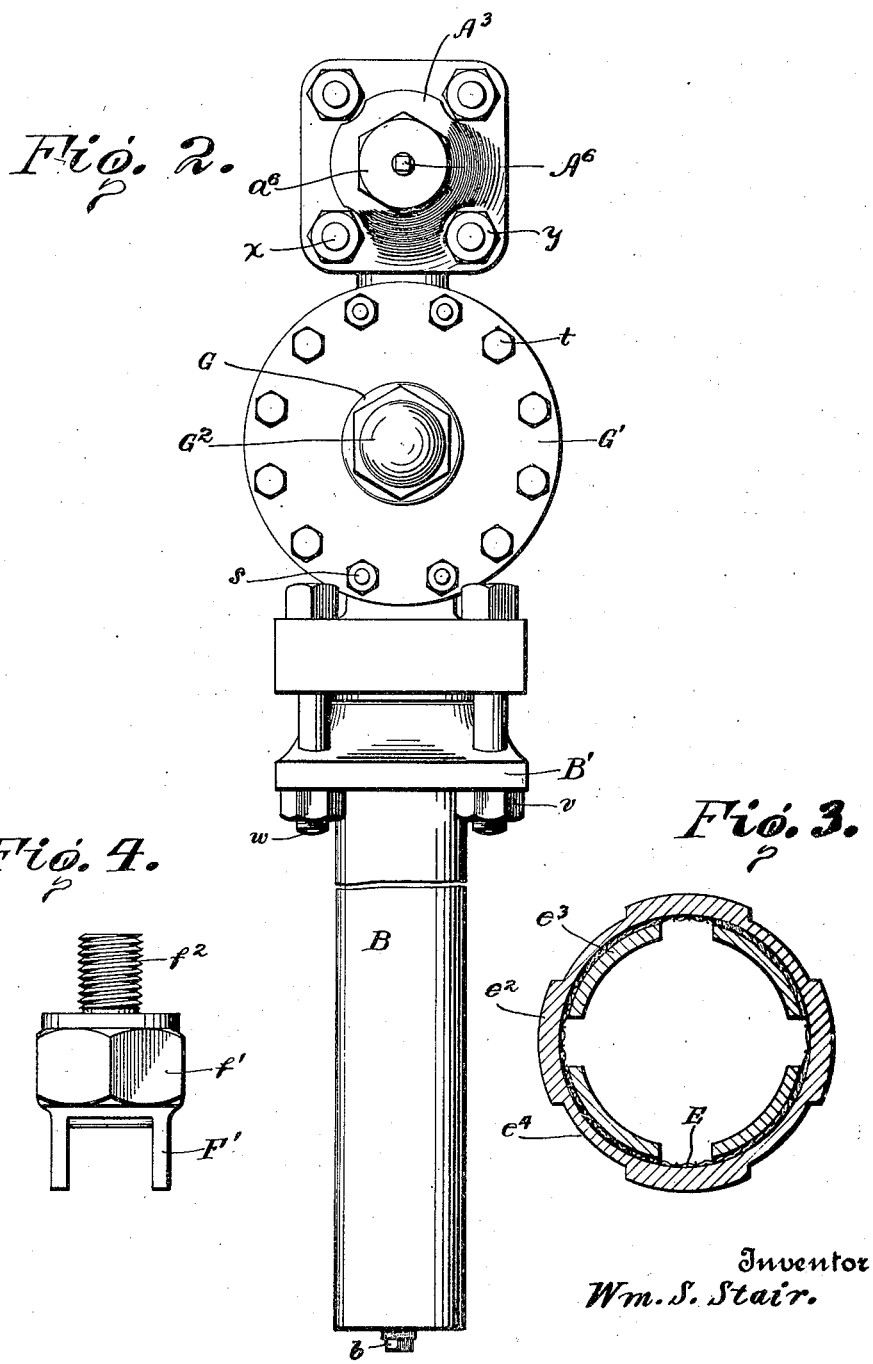

WILLIAM S. STAIR, OF BROOKLYN, NEW YORK, ASSIGNOR TO SHIPLEY CONSTRUCTION AND SUPPLY COMPANY, OF BROOKLYN, NEW YORK.

AUTOMATIC EXPANSION-VALVE.

1,341,766.  Specification of Letters Patent.  Patented June 1, 1920.

Application filed November 6, 1919. Serial No. 336,200.

*To all whom it may concern:*

Be it known that I, WILLIAM S. STAIR, of Brooklyn, in the county of Kings and State of New York, have invented a certain new and useful Improvement in Automatic Expansion-Valves, of which the following is a specification.

This invention relates to a valve for automatically controlling the flow of a liquid or gas under pressure so as to maintain an adjustable constant pressure of the fluid on the outlet side of the valve. The invention has been designed with more particular reference to its use in a refrigerating or ice making apparatus for the purpose of controlling the flow of the refrigerant from the high to the low pressure side thereof; although it will be understood, of course, that the valve can be employed for reducing any liquid or gas from high to low pressure. The chief feature which characterizes the invention is that the valve seat member of the valve, is mounted on one end of an elastic tube, preferably of steel, and held rigidly at the other end, through which tube the fluid under pressure whose flow is to be controlled passes to the valve, with which is combined means controlled by the fluid pressure on the outlet side of the valve, to force the steel tube out of its vertical or normal position in a direction to open the valve when the outlet pressure decreases, thus increasing the flow of fluid and thereby tending to increase the pressure on the outlet side. The steel tube will resist effort to move it from its normal position, or distort it, but, at the same time, a reasonable pressure will thus-distort it, while on the other hand, the removal of this pressure will permit it, by reason of its own inherent elasticity, to return to its original and normal shape and position. In connection with these instrumentalities I prefer to employ an auxiliary spring whose pressure upon the steel tube opposes that of the means controlled by the outlet pressure and acts to bend or distort the steel tube in a direction to close the valve, or reduce the flow therethrough, when the outlet pressure materially increases. These and other features of my invention will first be described in connection with the accompanying drawings, forming part of this specification and will then be more particularly pointed out in the claims.

In the drawings—

Fig. 2 is a side elevation of the same in a plane at right angles to the plane of section in Fig. 1—looking at it from the right hand side of Fig. 1.

Fig. 3 is a section on line 3—3 Fig. 1.

Fig. 4 is a side elevation detached of the saddle through the agency of which the steel tube is pressed in a direction to open the valve seat.

Figure 1:
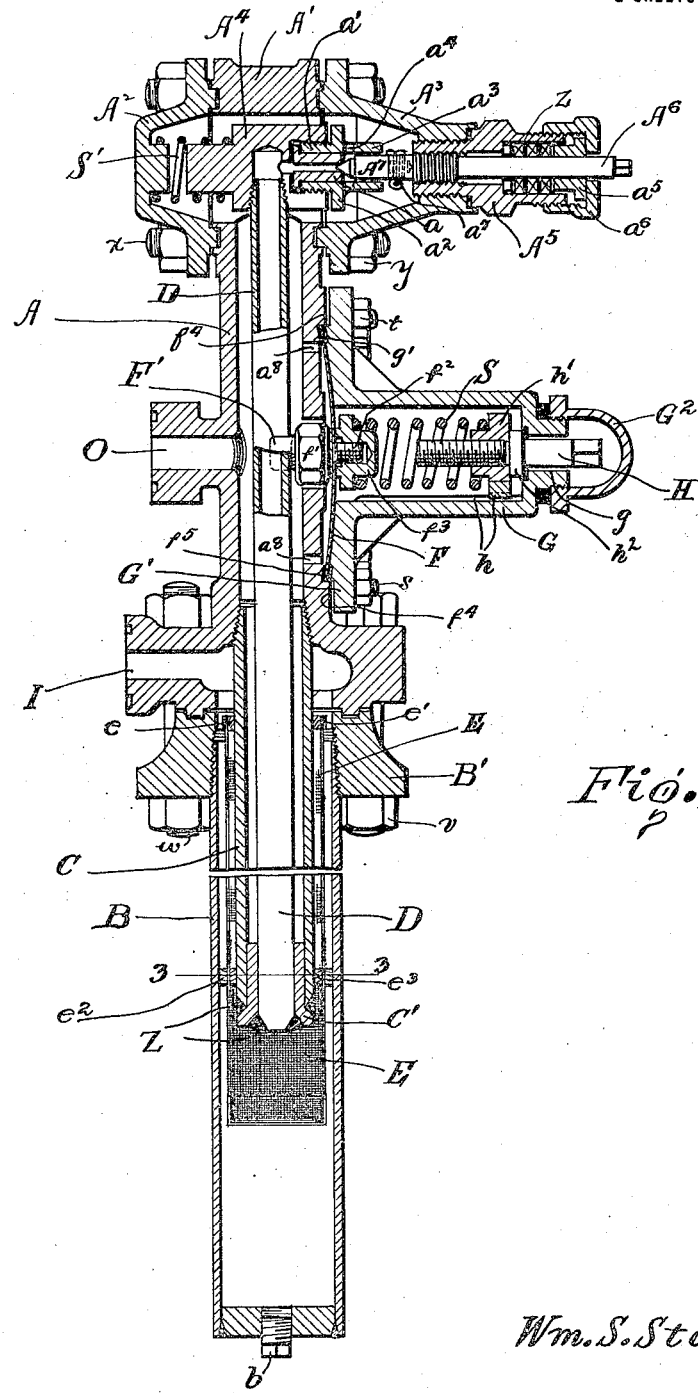
Figure 1 is a longitudinal axial section of an expansion valve embodying my invention in its preferred form.

The valve, of course, may be made in any varying sizes and dimensions according to the uses for which it may be designed. The structure shown in the drawing, for use in a refrigerating plant, is designed to be in the neighborhood of three feet in length over all; and is intended to be provided with a wall bracket (not shown) by which it may be fixed in upright position to the wall or other support provided for it.

The valve casing is formed as a unitary tubular casting A, terminating at its upper end in a horizontal cylindrical valve chamber A' which extends cross wise of the bore of the upright portion of the casing with which it communicates, and is closed at its ends by the caps $A^2$, $A^3$, which are drawn together tightly upon the opposite ends of the chamber by bolts $x$ and nuts $y$ as shown. The thus-formed valve chamber contains the valve seat body $A^4$, which screws upon the open screw threaded upper end of the steel tube D hereinafter more particularly referred to, and is provided internally with a passage way leading from the open end of the steel tube out through the tubular valve seat $a$. This valve seat, which is preferably made removable, has an annular base flange and is seated in a recess in the valve seat body, with which it makes a tight joint by means of a gasket of lead or other suitable material, upon which the flanged base of the valve seat is tightly pressed by the valve seat gland $a'$ which screws into the valve seat receiving recess in the valve seat body $A^4$ and upon the flanged end of the valve seat therein, as shown. The valve seat gland $a'$, is provided with a head $a^2$ by which it may be manipulated; a tubular prolongation $a^3$ beyond said head, on the axial prolongation of the valve seat, to receive, and form a guide way for, the front end of the valve stem; and with lateral openings $a^4$ for the escape of the fluid passing out through the valve seat. The cap $A^3$ at the valve stem end of the valve chamber $A'$ is formed as a bonnet body to receive the bonnet $A^5$ which screws into the outer end of the bonnet body $A^3$, and makes a tight joint therewith. The valve stem $A^6$ extends through the bonnet, being externally screwthreaded to engage a correspondingly threaded bearing in the interior of the bonnet. The end of the valve stem which projects through the bonnet body is packed as indicated at $z$, Fig. 1, the packing being maintained tight by a gland $a^5$ and gland nut $a^6$. The valve point $A^7$ is preferably removably attached to the valve stem $A^6$—in this instance by a pin and socket connection $a^7$. The object of making both the valve point and valve seat readily removable, is to permit either or both of them to be replaced when a different size is required to suit particular conditions, or when worn, through use. The end of the valve stem $A^6$ which projects beyond the gland nut $a^6$, is squared to receive an operating handle. The arrangement of parts is such as to permit the valve point to be readily adjusted while the valve is in operation.

The base of the valve casing fits snugly upon tubular head $B'$ to which it is detachably held by bolts and nuts $v$, $w$. The head $B'$ is mounted upon the upper end of the outer cast metal pipe B which screws into it, said pipe being closed at the bottom, and provided at that point with a removable plug $b$. The inlet I in the valve casing communicates with the interior of this pipe.

Within the outer pipe B and arranged concentrically therewith, is the intermediate cast metal pipe C of sufficiently smaller diameter than the outer pipe B to leave between them an annular space as shown. The intermediate pipe C at its lower end terminates some distance short of the bottom of the outer pipe B, while its upper end extends up into the valve casing to a point above the inlet I, where it meets and screws tightly into the bore of the valve casing which at and above that point is somewhat contracted as compared with the portion of the bore below. The interior of the intermediate pipe, through the bore of the casing and the valve seat chamber above, communicates with the outlet side of the valve. In the side of the valve casing above the point where the intermediate pipe is screwed into the bore of the casing is located the outlet O which opens into the bore and through it into the intermediate pipe C.

The intermediate pipe is closed at the bottom by a tubular plug $C'$ which is inserted into the lower end of the tube and fits closely therein. The open lower end of the inner steel tube D is inserted into and closely fits the bore of the plug, the extreme end of said tube projecting through and slightly beyond the base of the plug as shown. The plug, which is tightly sealed to the intermediate pipe C on the one hand and to the inner steel tube D on the other hand, preferably by a welded joint Z, forms a stiff and unyielding base support for the steel tube, which will permit the lateral flexing of the body of the tube in one direction or the other according to circumstances.

The fluid under pressure which enters through the inlet I passes first down through the annular space between the pipes B, C; thence up through the inner steel tube D; thence out through the valve seat into the valve chamber $A'$; thence down into the annular space between inner steel tube D and the casing A and intermediate pipe C; and thence to outlet O.

Concentrically arranged within the outer pipe B is a tubular metallic screen E, the vertical walls of which are located in the annular space between the outer pipe B and the intermediate pipe C and extend down beyond the latter into the open space below in the pipe B, the screen being closed at the bottom by like screening material. The screen at the top is secured tightly to the exterior of the intermediate pipe by means of inner and outer metallic rings $e$, $e'$ between which the upper end of the screen material is inserted, the rings being secured to one another, to the screen and also to the pipe preferably by a solder joint which will exclude the entrance of the fluid at that point to the annular space between the walls of the screen and the intermediate pipe.

At a point lower down the screen is again held between a ring $e^2$ on the outside, fitting closely between the inner wall of the outer tube B, and the outside of the screen, and metallic segments $e^3$ on the inside, fitting closely between the inside of the screen and the outer wall of the intermediate pipe C, the parts being firmly soldered or otherwise joined together. The outer ring $e^2$ has transverse notches or grooves $e^4$ in its periphery to permit the fluid under pressure to pass down freely therethrough into the space below whence it can filter up through the bottom of the strainer to join the fluid which has already passed through the walls of the strainer above. By this construction I am enabled to efficiently provide the valve structure with a screen having a large area of straining surface, thus eliminating the necessity of frequent cleaning. It remains to describe the means by which the outlet pressure is exerted upon the steel tube D.

These means consist primarily of a saddle F' (shown in sectional elevation in Fig. 1 and in side elevation Fig. 4), which straddles the steel tube D in such position that its pressure laterally upon the tube D is delivered in a direction to move the valve seat which it carries away from the valve point, for which purpose it is mounted on and carried by a diaphragm F, preferably of sheet steel, located at a suitable point on the valve casing A—in this instance at a point opposite to the outlet O on the other side of the casing. At this point the valve casing is formed with a circular outer seat $f^4$ of sufficient diameter to receive the circular base G' of the diaphragm bonnet G, and an inner annular concentric recessed seat $f^5$ to receive the rim of the diaphragm. The base G' of the diaphragm bonnet is held to its seat $f^4$ by screws $s$ and nuts $t$. The diaphragm rim is pressed tightly into its seat $f^5$ by an annular ribbed or projecting portion $g'$ on the inner face of the diaphragm bonnet base G', there being provided at these points lead or equivalent gaskets for making the joint fluid tight. The saddle F' has a head $f'$, and a screw stem $f^2$. The screw stem passes up through an axial hole in the diaphragm to receive a lock nut $f^3$, between which and the head $f'$ the saddle is tightly and securely clamped to the diaphragm. The valve casing is formed with suitable apertures $a^8$ through which the fluid at outlet pressure contained in the annular space between the casing and the inner steel tube D, can have free access to the inner face of the diaphragm, which is thus subject at all times to outlet pressure. The air within the diaphragm bonnet, and having contact with the exterior face of the diaphragm, is at atmospheric pressure.

Through a cylindrical bearing $g$ formed in the outer end of the diaphragm bonnet passes the adjusting stem H the outer end of which is squared to receive a removable operating handle. When not in use, the operating handle is preferably removed, and the end of the adjusting stem is covered by a cap $G^2$ which screws upon the threaded exterior of the projecting end of the bearing $g$. Upon that portion of the adjusting stem within the bonnet G is a collar $h^2$ rigidly fixed to the stem and adapted to bear against the inner face of the bearing $g$. The stem for the remainder of its length is externally screw threaded to receive a correspondingly internally screw threaded thrust block $h'$, which is mounted upon this portion of the stem and is provided with a longitudinal groove and tongue connection $h$ with the interior of the bonnet G so that when the adjusting stem is rotated the thrust block will be caused to move longitudinally without rotation in one direction or the other, according to the direction of rotation of the adjusting stem. Between the thrust block and the lock nut $f^3$ is a spring S, the pressure of which is exerted upon the diaphragm in a direction opposed to that of the outlet pressure.

An auxiliary spring S' is also interposed between the valve seat body and the cap $A^2$ of the valve chamber which tends to flex the steel tube in a direction to move the valve seat toward the valve—thus opposing the action of the spring S.

The diaphragm, as already said, is subjected from within to the outlet pressure and from without to the atmospheric pressure. This difference in pressure is counterbalanced by the spring S the tension of which is so adjusted, by means of the adjusting stem, as to leave the steel tube in neutral position, when the outlet pressure is at the normal pressure required.

When the valve is open with the operative parts adjusted to allow the steel tube to occupy its neutral position so long as the normal outlet pressure for which the adjustments are designed is maintained, then whenever the outlet pressure rises above the normal, the diaphragm will thereby be forced out against the stress of the spring S thus releasing or diminishing the pressure of the diaphragm saddle on the steel tube and allowing the auxiliary spring S' to bend the steel tube in a direction to cause the valve seat which it carries to approach the valve point thus decreasing the flow of fluid through the valve, and thereby reducing the outlet pressure. On the other hand, on reduction of outlet pressure below the normal, the diaphragm will be pushed in by its spring thereby forcing the diaphragm saddle against the steel tube with the effect of flexing it in a direction to move the valve seat which it carries away from the valve point, allowing more liquid to pass through the valve thereby increasing the outlet pressure. These two operations balance, as it were, so that the valve will maintain a substantially uniform outlet pressure.

In the thus-described construction and arrangement of the operative parts of the valve, it will be noted that both the valve seat and valve point are readily removable so that they may be changed when worn, or replaced by others of a different size to suit particular conditions as required. It will also be noted that the adjustment both of the valve point and of the means for regulating the outlet pressure can readily be effected while the valve is in operation.

In case the valve is used to control the flow of anhydrous ammonia or other vaporizable liquid, then, if the outlet pressure is below the vaporization point of the liquid, part of the liquid on the outlet side of the valve will evaporate, thus reducing the temperature of the liquid and the surrounding metal. As this liquid will fill the annular space between the inner steel tube D and the intermediate pipe C, it will therefore remove heat from the liquid which passes down from the inlet through the annular space between the intermediate pipe C and the outer pipe B, and also from that which passes up through the inner steel tube D, thus acting as an efficient pre-cooler for the liquid before it reaches and passes through the valve. Any oil entering with the liquid will be chilled and will tend to congeal and settle in the lower part of the tube B, from whence it can be removed through the opening closed by the drain plug *b*. The pipe B forms in effect a part of the valve casing, being a prolongation of the tubular stem of that casing.

Having described my invention and the best way known to me of carrying the same into practical effect, I state in conclusion that I do not restrict my claim to the structural details hereinbefore shown and set forth in illustration of my improvement, since manifestly the same can be varied in many particulars without departure from the spirit of the invention; but what I claim herein as new and desire to secure by Letters Patent is as follows:—

1. In an automatic expansion valve, the combination of a valve casing; an elastic flexible tube within the valve casing secured at the one end to the casing and adapted to offer spring yielding resistance to pressure tending to flex or bend it laterally out of its normal or neutral position; a valve seat body mounted on the free extremity of the tube and provided with an orifice communicating with the interior of same; a valve mounted in the valve casing adapted to register with and control the discharge end of the orifice through the valve body; an inlet through which the fluid under pressure passes into the lower open end of the tube and up through the same into, and out from the discharge end of, the orifice through the valve seat body; and an outlet in the valve casing and means controlled by the outlet pressure to laterally flex or bend the tube in a direction to move the valve seat body away from the valve point and thus increase the flow of fluid under pressure through the valve whenever and so long as the pressure on the outlet side of the valve is below the normal outlet pressure.

2. In an automatic expansion valve, the combination of a valve casing comprising a tubular stem and a valve chamber surmounting said stem; an elastic flexible steel tube, open at both ends, within the valve casing, extending up through the stem of the casing into the valve chamber above, secured rigidly at its lower end to the casing and adapted to offer spring yielding resistance to pressure tending to flex or bend it laterally out of its normal or neutral position; a valve seat body mounted on the free extremity of the steel tube and provided with an orifice through it communicating with the interior of the same; a valve and valve stem mounted and adjustable in the head of the valve chamber to control the discharge end of the orifice through the valve body; an inlet through which the fluid under pressure passes into the lower part of the stem of the casing and thence into the lower open end of the steel tube and up through the same, into, and out from the discharge end of, the orifice through the valve seat body; an outlet in the valve casing and a passage, separate and distinct from the inlet passage, leading thereto from the outlet side of the valve; and means controlled by the outlet pressure to laterally flex or bend the steel tube in a direction to move the valve seat body away from the valve point and thus increase the flow of fluid under pressure through the valve whenever and so long as the pressure on the outlet side of the valve is below the normal outlet pressure.

3. In an automatic expansion valve, the combination of a valve casing comprising a tubular stem and a valve chamber surmounting said stem, an outlet pipe forming a continuation of the valve casing closed at its lower end and at its upper end secured to and communicating with the lower end of the tubular stem of the casing; an inlet in the stem of the valve casing communicating with the interior of the outer pipe; an intermediate pipe having its upper open end tightly fitted into and secured to the interior walls of the valve casing stem at a point above that at which the inlet is located; an outlet in the side of the valve casing above the joint where the intermediate pipe is secured to the latter, and communicating with the annular space between the valve casing and the intermediate pipe; an inner open ended steel tube arranged concentrically within the intermediate pipe, having its lower end secured tightly in, and opening downward through the closed lower end of the intermediate pipe, and its upper end projecting up through the stem of the valve casing into the valve chamber above; a valve seat body on the upper end of the steel tube provided with an orifice through it communicating with the interior of the same; a valve-proper and valve stem adjustably mounted in the head of the valve chamber to control the flow of the fluid under pressure through said orifice; a diaphragm seated upon the side of the valve casing above the point where the intermediate pipe is secured to the interior of the casing, the casing being provided with openings to permit the fluid under pressure in this portion of valve casing, to meet the inner face of the diaphragm; a saddle secured to the diaphragm and adjusted to bear against the side of the steel tube in a direction to carry the valve seat away from the valve; a tension spring arranged to bear against the outer face of the diaphragm and to oppose the pressure exerted by the fluid under pressure against the inner face of the diaphragm; and means for adjusting the tension of said diaphragm spring at will.

4. In combination with the subject matter of claim 3, an auxiliary spring arranged to bear against the valve seat body in a direction to oppose the pressure exerted by the diaphragm spring.

5. In combination with the subject matter of claim 3, a screen the walls of which are concentrically located in the annular space between the outer and intermediate pipes extending below the latter pipe, and having a screen closure at the bottom.

6. In an automatic expansion valve, the combination with the valve casing and the valve, of the outer and intermediate pipes and the inner steel tube arranged concentrically within one another as described to form liquid legs—the one of substantially U shape, comprising the annular space between the outer and the intermediate pipes, communicating at its upper end with the inlet in the valve casing and at its lower end, with the central steel tube from the upper end of which the fluid passes into the valve seat body, the other, of annular shape, interposed between the two members of the U shaped inlet leg, communicating at one end with the outlet in the valve casing and at the other end with the interior of the valve chamber on the outlet side of the valve, whereby the fluid in the intermediate liquid leg on the outlet side of the valve may act as a pre-cooler for the fluid in the U liquid leg on the inlet side of the valve, substantially as hereinbefore stated.

In testimony whereof I affix my signature.

WILLIAM S. STAIR.